(12) United States Patent
Harada et al.

(10) Patent No.: US 7,313,180 B2
(45) Date of Patent: Dec. 25, 2007

(54) RECEIVING DEVICE, RECEIVING METHOD, AND PROGRAM

(75) Inventors: Hiroshi Harada, Tokyo (JP); Masayuki Fujise, Tokyo (JP); Ryuuhei Funada, Tokyo (JP); Manabu Sawada, Aichi (JP)

(73) Assignee: National Institute of Information and Communications Technology Incorporated Administrative Agency, Tokyo (JP)

( * ) Notice: Subject to any disclaimer, the term of this patent is extended or adjusted under 35 U.S.C. 154(b) by 633 days.

(21) Appl. No.: 10/789,672

(22) Filed: Feb. 27, 2004

(65) Prior Publication Data

US 2004/0184561 A1 Sep. 23, 2004

(30) Foreign Application Priority Data

Feb. 28, 2003 (JP) ............................. 2003-052680

(51) Int. Cl.
*H03H 7/30* (2006.01)
(52) U.S. Cl. .................................... 375/229
(58) Field of Classification Search ................ 375/229, 375/316
See application file for complete search history.

(56) References Cited

U.S. PATENT DOCUMENTS

| | | | |
|---|---|---|---|
| 6,169,751 B1 * | 1/2001 | Shirakata et al. | 370/480 |
| 6,959,052 B2 * | 10/2005 | Harada et al. | 375/340 |
| 2002/0018528 A1 * | 2/2002 | Harada et al. | 375/260 |
| 2002/0126774 A1 * | 9/2002 | Harada et al. | 375/340 |
| 2002/0141495 A1 * | 10/2002 | Hatamian | 375/229 |
| 2003/0108123 A1 * | 6/2003 | Kroeger et al. | 375/316 |

* cited by examiner

*Primary Examiner*—David C. Payne
*Assistant Examiner*—Leon-Viet Q Nguyen
(74) *Attorney, Agent, or Firm*—Mitchell P. Brook, Esq.; Luce, Forward, Hamilton & Scripps LLP

(57) ABSTRACT

A receiving unit of a receiving device receives a signal arriving thereto through a transmission path as a reception signal. A delay unit outputs a delay signal obtained by delaying the reception signal by a predetermined delay time. An estimation unit estimates a transmission path characteristic. An equalizer/demodulator compensates for the delay signal with the transmission path characteristic, demodulates the compensation result, and outputs the demodulation result as a transmission signal. A replica unit compensates for the reception signal with the transmission path characteristic, demodulates the compensation result, modulates the demodulation result, and outputs the modulation result as a replica signal. The estimation unit estimates a transmission path characteristic by comparing the reception signal with the replica signal. The predetermined delay time is equal to or smaller than a time required for the processes by the replica unit and the estimation unit.

8 Claims, 9 Drawing Sheets

RECEIVING DEVICE, RECEIVING METHOD, AND PROGRAM

BACKGROUND OF THE INVENTION

1. Field of the Invention

The present invention relates to a receiving device and receiving method suitable for adaptively estimating a transmission path characteristic and equalizing a received signal in mobile communication, particularly orthogonal frequency division multiplex (OFDM) packet mobile communication, and a program for realizing these by a computer.

2. Description of the Related Art

In a packet radio communication system, there have conventionally been proposed various techniques for compensating for a distortion in a signal arriving through a plurality of transmission paths.

For example, there has been proposed a method wherein, for estimation of a transmission path characteristic, a sending device inserts a known signal into a preamble of a packet, and a receiving device estimates the first transmission path characteristic by comparing an actually received signal with the known signal (or its modulated signal). Further, the receiving device obtains a transmitted signal by equalizing a data signal coming after the known signal by using the first transmission path characteristic, and estimates the next transmission path characteristic by comparing the obtained transmitted signal (or its modulated signal, which is referred to as "replica") with a corresponding portion of the actually received signal. The receiving device repeats this process for the following data signals.

Because a transmission path characteristic obtained in the above-described manner includes influences of noise, etc., there have been proposed such methods as described below for reducing the influences.

(1) To carry out averaging in a direction of a frequency axis.

(2) To carry out averaging in a direction of a time axis.

(3) To carry out averaging in a direction of a time axis, and abandon the obtained value if it is a prominent value.

In these techniques, equalization of a transmitted signal, generation of a replica, and estimation of a transmission path characteristic require time. That is, if the receiving process is performed in real time, an obtained transmission path characteristic is to be used for equalization of a received signal which arrives later by such a time as required for the equalization, the generation of a replica, etc. to be performed. Therefore, if the transmission path characteristic changes in this process performance time, there occurs a problem that the difference between the estimated transmission path characteristic and the actual transmission path characteristic is large, causing deterioration in the receiving characteristic.

The present invention was made for solving the above-described problem, an object of the present invention is to provide a receiving device and receiving method suitable for adaptively estimating a transmission path characteristic and equalizing a received signal in mobile communication, particularly OFDM packet mobile communication, and a program for realizing these by a computer.

SUMMARY OF THE INVENTION

To achieve the above object, the following invention is disclosed in accordance with the principle of the present invention.

A receiving device according to a first aspect of the present invention comprises a receiving unit, a delay unit, an estimation unit, an equalizer/demodulator, and a replica unit, and is structured as follows.

The receiving unit receives a signal arriving through a transmission path, as a reception signal.

The delay unit outputs a delay signal which is obtained by delaying the reception signal by a predetermined delay time.

The estimation unit estimates a transmission path characteristic.

The equalizer/demodulator compensates for the delay signal with the estimated transmission path characteristic, demodulates a compensation result, and outputs a demodulation result as a transmission signal.

The replica unit compensates for the reception signal with the estimated transmission path characteristic, demodulates a compensation result, modulates a demodulation result, and outputs a modulation result as a replica signal.

The estimation unit estimates a transmission path characteristic by comparing the reception signal with the replica signal.

The predetermined delay time is equal to or smaller than a time required for processes by the replica unit and the estimation unit.

In the receiving device of the present invention, the predetermined delay time may be equal to a time required for processes by the replica unit and the estimation unit.

In the receiving device of the present invention, the estimation unit may estimate a transmission path characteristic by "comparing a signal obtained by delaying the reception signal by the predetermined delay time with the replica signal" instead of by "comparing the reception signal with the replica signal".

In the receiving device of the present invention, the estimation unit may average a time series of characteristics obtained as a result of the comparing by a predetermined time length, and regard the time series of characteristics obtained as a result of the averaging as the transmission path characteristic.

The receiving device of the present invention may use orthogonal frequency division multiplex, and the delay unit, the estimation unit, the equalizer/demodulator, and the replica unit may perform their processes for each carrier frequency of the orthogonal frequency division multiplex.

A receiving method according to another aspect of the present invention comprises a receiving step, a delaying step, an estimating step, an equalizing/demodulating step, and a replica step, and is structured as follows.

The receiving step receives a signal arriving through a transmission path as a reception signal.

The delaying step outputs a delay signal obtained by delaying the reception signal by a predetermined delay time.

The estimating step estimates a transmission path characteristic.

The equalizing/demodulating step compensates for the delay signal with the transmission path characteristic, demodulates a compensation result, and outputs a demodulation result as a transmission signal.

The replica step compensates for the reception signal with the transmission path characteristic, demodulates a compensation result, modulates a demodulation result, and outputs a modulation result as a replica signal.

The estimation step estimates a transmission path characteristic by comparing the reception signal with the replica signal.

The predetermined delay time is equal to or smaller than a time required for processes in the replica step and the estimating step.

In the receiving method of the present invention, the predetermined delay time may be equal to a time required for processes in the replica step and the estimating step.

In the receiving method of the present invention, the estimating step may estimate a transmission path characteristic by "comparing a signal obtained by delaying the reception signal by the predetermined delay time with the replica signal" instead of by "comparing the reception signal with the replica signal".

In the receiving method of the present invention, the estimating step may average a time series of characteristics obtained as a result of the comparing by a predetermined time length, and regard the time series of characteristics obtained as a result of the averaging as the transmission path characteristic.

The receiving method of the present invention may use orthogonal frequency division multiplex, and the delaying step, the estimating step, the equalizing/demodulating step, and the replica step may perform processes for each carrier frequency of the orthogonal frequency division multiplex.

A program according to yet another aspect of the present invention is structured so as to control a computer (including a DSP Digital Signal Processor), an FPGA (Field Programmable Gate Array), or an ASIC (Application Specific Integrated Circuit)) to function as the above-described receiving device or to execute the above-descried receiving method.

An information recording medium carrying the program of the present invention may be distributed or sold independently from such a computer.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
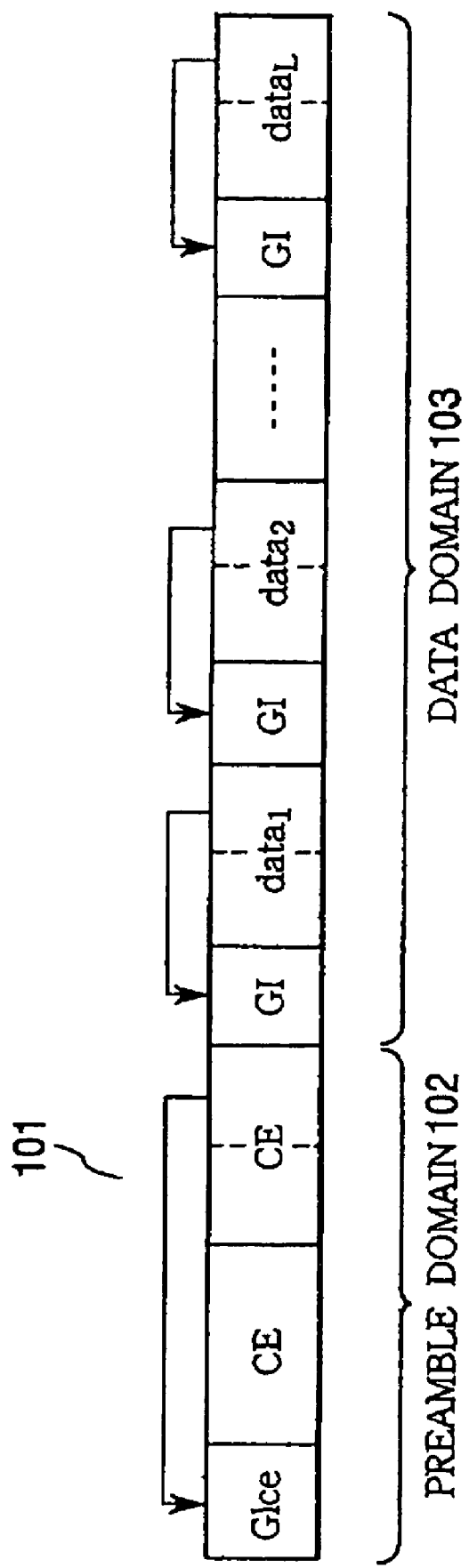
FIG. 1 is an exemplary diagram showing a format of a frame used in an embodiment of the present invention and including known signals and data signals.

An embodiment of the present invention will now be explained The embodiment to be explained below is intended for illustrating, and not intended for restricting the scope of the present invention. Accordingly, although a person skilled in the art is able to employ an embodiment in which individual elements or all the elements of the embodiment to be explained below are replaced with equivalents of those, such an embodiment is regarded to be included in the scope of the present invention.

In order to facilitate understanding, OFDM packet communication will be taken as an example in the explanation below. However, the method of the present invention can be applied to other types of communication systems, and such embodiments are regarded to be included in the scope of the present invention. Further, in the drawings of the present application, an I channel and a Q channel are sometimes shown separately by two lines, and sometimes shown together by one line.

(Format of a Packet)

FIG. 1 shows a frame format of an OFDM packet used in a first embodiment of the present invention. The explanation below will be made with reference to FIG. 1.

A frame (burst) 101 comprises a preamble domain 102 and a data domain 103.

The preamble domain 102 includes two known symbols CE and one guard interval GIce for these symbols. The number of known symbols CE may be increased. In a case where there are a plurality of known symbols CE, estimation of a transmission path characteristic is carried out by using the average of received symbols of these symbols CE.

On the other hand, the data domain 103 includes a plurality of data (data$_1$, . . . , data$_L$) requested to be transmitted, and an L number of guard intervals GI for sectioning the plurality of data Each guide interval GI is a copy of the tail part of each symbol to be transmitted, which is copied for a predetermined time, as indicated by arrows in FIG. 1.

Since according to IEEE 802.11a standard, transmission is available by using a plurality of modulation systems and a plurality of coding ratios, an OFDM symbol "SIGNAL" which is coded with a coding ratio of 1/2 and modulated by a BPSK system is arranged after a known symbol CE. By using the SIGNAL, the modulation system and coding ratio used in the data domain 103 of the frame 101 are notified to the receiver side.

At the receiver side, a first OFDM symbol (corresponding to the SIGNAL) is corrected by the known signal CE, and based on this demodulation result, the modulation system and coding ratio are determined. Due to this, the modulation system and coding ratio used at the sender side can be known.

The present invention can be applied to this embodiment where such notification of the modulation system and coding ratio is performed, and this embodiment is also regarded to be included in the scope of the present invention. To facilitate understanding, explanation on notification of the modulation system and use of this information at the receiver side is omitted in FIG. 1 and in the following description.

(Sending Device)

Figure 2:
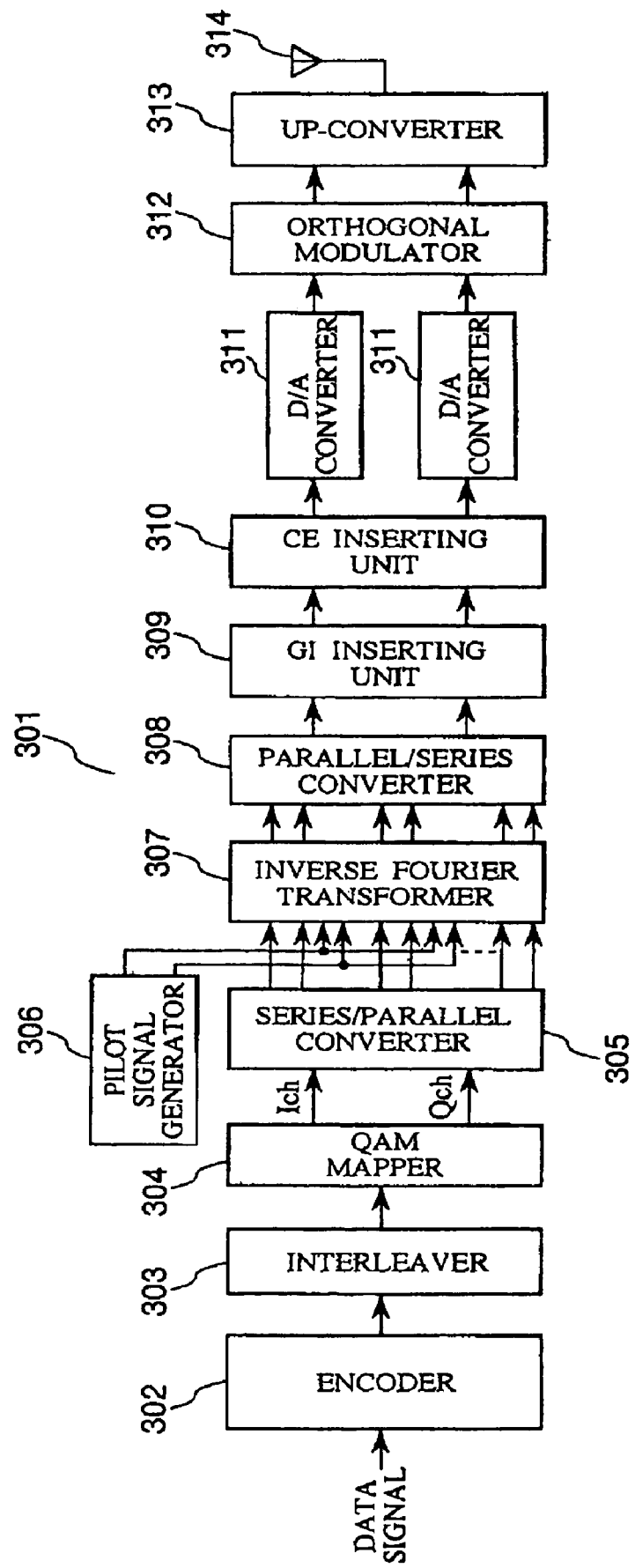
FIG. 2 is an exemplary diagram showing a schematic structure of a sending device which is used as a pair to a receiving device according to an embodiment of the present invention.

A sending device to be used as a pair to a receiving device of the present embodiment will first be explained. FIG. 2 is an exemplary diagram showing a schematic structure of the sending device. The sending device shown in FIG. 2 corresponds to the one that is employed in IEEE 802.11a, ARIB-MMAC. However, sending devices having various other structures than this can be used as a pair to the receiving device of the present invention.

The sending device 301 convolutionally encodes an entered data signal in units of packet by an encoder 302, in order to prepare the signal for error correction.

Further, an interleaver 303 performs interleaving, so that the order of the code sequence is shuffled and the data are scrambled.

Then, a QAM mapper 304 maps the scrambled data to 16 QAM values.

A series/parallel converter 305 series/parallel-converts the data into sub-channel signals.

Other than these data, also a pilot signal generated by a pilot signal generator 306 is included in the sub-channel signals.

An inverse Fourier transformer 307 inverse-Fourier-transforms these sub-channel signals, and a parallel/series converter 308 parallel/series-converts the sub-channels to convert them into OFDM base band signals.

Further, a GI inserting unit 309 inserts guard intervals to reduce intersymbol interference and improve resistance to multipath. As described above, guard intervals are a copy of the tail part of each symbol to be transmitted, which is copied for a predetermined time.

A CE inserting unit 310 inserts CE symbols to the head of a thusly obtained burst. D/A converters 311 convert the data signals into an analog signal. An orthogonal: modulator 312 applies orthogonal conversion to the obtained analog signal. An up-converter 313 applies frequency conversion to the analog signal to be in an RF band, and this analog signal is sent out from an antenna 314.

(Receiving Device)

Figure 3:
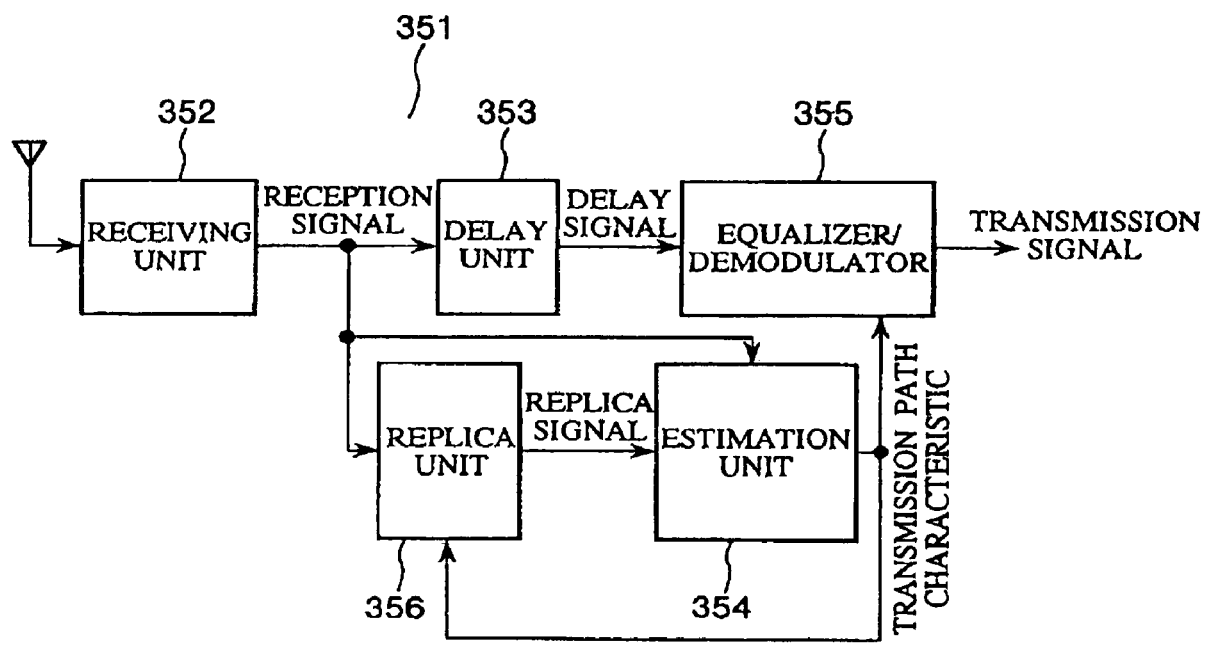
FIG. 3 is an exemplary diagram showing a functional structure of a receiving device according to an embodiment of the present invention.

FIG. 3 is an exemplary diagram showing a functional structure of the receiving device of the present embodiment. The following explanation will be made with reference to FIG. 3.

The receiving device 351 of the present embodiment comprises a receiving unit 352, a delay unit 353, an estimation unit 354, an equalizer/demodulator 355, and a replica unit 356.

First, the receiving unit 352 receives a signal arriving through a transmission path as a reception signal. Then, the delay unit 353 outputs a delay signal which is a signal obtained by delaying the reception signal by a predetermined delay time. In the meantime, the estimation unit 354 estimates a transmission path characteristic. The method for estimation will be described later.

Figure 4:
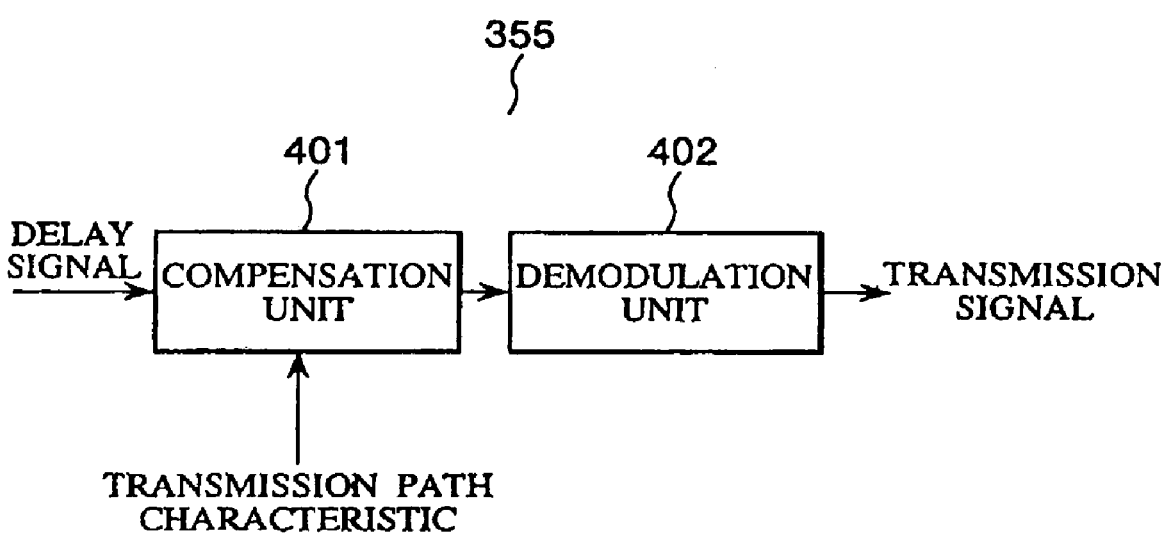
FIG. 4 is an exemplary diagram showing a functional structure of an equalizer/demodulator of a receiving device according to an embodiment of the present invention.
Figure 5:
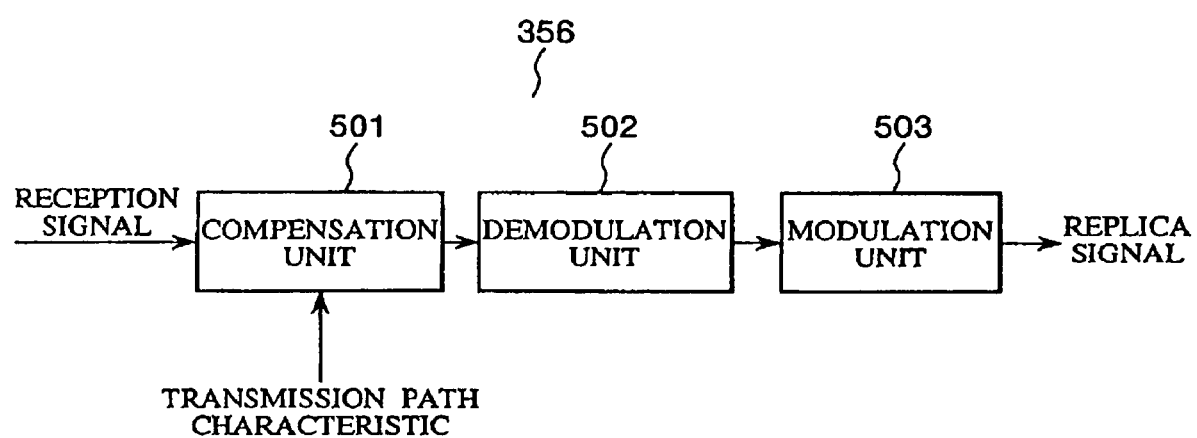
FIG. 5 is an exemplary diagram showing a functional structure of a replica unit of a receiving device according to an embodiment of the present invention.

Further, the equalizer/demodulator 355 compensates for the delay signal with the estimated transmission path characteristic, demodulates the compensation result, and outputs the demodulation result as a transmission signal. Accordingly, as shown in FIG. 4, the equalizer/demodulator 355 includes a compensation unit 401 for compensating for the delay signal, and a demodulation unit 402 for demodulating the compensation result Then, the replica unit 356 compensates for the reception signal with the transmission path characteristic, demodulates the compensation result, then modulates the demodulation result, and outputs the modulation result as a replica signal. Accordingly, as shown in FIG. 5, the replica unit 356 includes a compensation unit 501 having the same function as the compensation unit 401, a demodulation unit 502 having the same function as the demodulation unit 402, and a modulation unit 503 for modulating the demodulation result likewise the sending device 301.

The estimation unit 354 estimates a transmission path characteristic by comparing the reception signal with the replica signal.

Here, the predetermined delay time is equal to or shorter than a time required for the processes performed by the replica unit 356 and the estimation unit 354. Particularly, it is preferred that the predetermined delay time be equal to the time required for the processes performed by the replica unit 356 and the estimation unit 354.

Further, it is preferred that the estimation unit 354 estimate a transmission path characteristic by "comparing a signal obtained by delaying the reception signal by the predetermined delay time with the replica signal" instead of "comparing the reception signal with the replica signal". Furthermore, it is preferred that the estimation unit 354 average time series of the transmission path characteristic obtained as a result of the comparison by a predetermined length of time, and achieve the time series of the characteristic obtained as a result of averaging as the transmission path characteristic.

Figure 6:
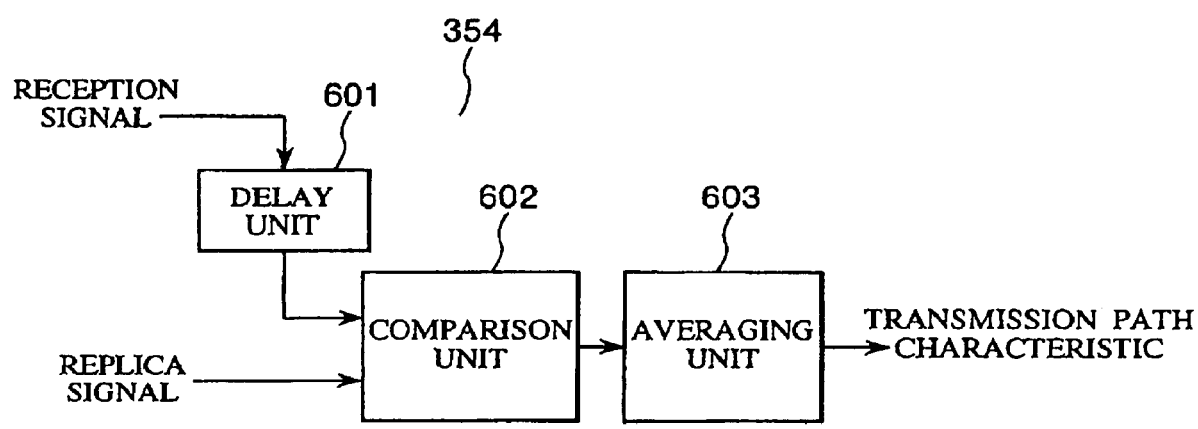
FIG. 6 is an exemplary diagram showing a functional structure of an estimation unit of a receiving device according to an embodiment of the present invention.

The schematic structure of the estimation unit 354 according to this preferred embodiment is shown in FIG. 6. The estimation unit 354 includes a delay unit 601, a comparison unit 602, and an averaging unit 603.

First, the delay unit 353 accepts the reception signal and delays the reception signal. The delay time here is equal to "time of delay caused by passing through the delay unit 601, the comparison unit 602, and the averaging unit 603".

Meanwhile, the comparison unit 602 compares the signal delayed by the delay unit 601 with the replica signal.

Then, the averaging unit 603 buffers and averages the time series of the comparison result output by the comparison unit 602, thereby reducing the influence of noise components.

In a case where the receiving device 351 having such a functional structure is applied to orthogonal frequency division multiplex packet mobile communication, the delay unit 353, the estimation unit 354, the equalizer/demodulator 355, and the replica unit 356 may perform their processes at each carrier frequency of the orthogonal frequency division multiplex.

By comparing FIG. 4 and FIG. 5, it is obvious that the compensation unit 401 and demodulation unit 402 of the equalizer/demodulator 355 and the compensation unit 501 and demodulation unit 502 of the replica unit 356 are structured as separate circuits having the same function. As shown in FIG. 3, the transmission path characteristic is supplied to both of them at the same timing. Therefore, if the same signal is supplied to the compensation units 401 and 501 at the same timing, output from the demodulation units 402 and 502 should be at the same timing.

However, according to the present invention, a delay signal is supplied to the compensation unit 401 and a reception signal is supplied to the compensation unit 501 respectively, at the same time.

The processes by the replica unit 356 and the estimation unit 354 take some time (hereinafter referred to as "delay time Δt"). Therefore, the replica unit 356 compensates for "the reception signal at a certain timing t" with "the transmission path characteristic which is estimated for a timing t-Δt which is prior to the timing t by the delay time Δt".

On the other hand, a delay signal which is obtained by delaying "the reception signal at the certain timing t" by the delay time Δt is input to the compensation unit 401 of the equalizer/demodulator 355. That is, the compensating unit 401 compensates for "the delay signal at the timing t=the reception signal at the timing t-Δt" with "the transmission path characteristic which is estimated for the timing t-Δt".

Accordingly, it is expected that the compensation by the compensation unit 401 is better in performance than the compensation by the compensation unit 501. The result of this experiment will be described later.

As described above, according to the present embodiment, it is possible to improve the receiving characteristic by preparing two routes for compensation and demodulation.

Figure 7:
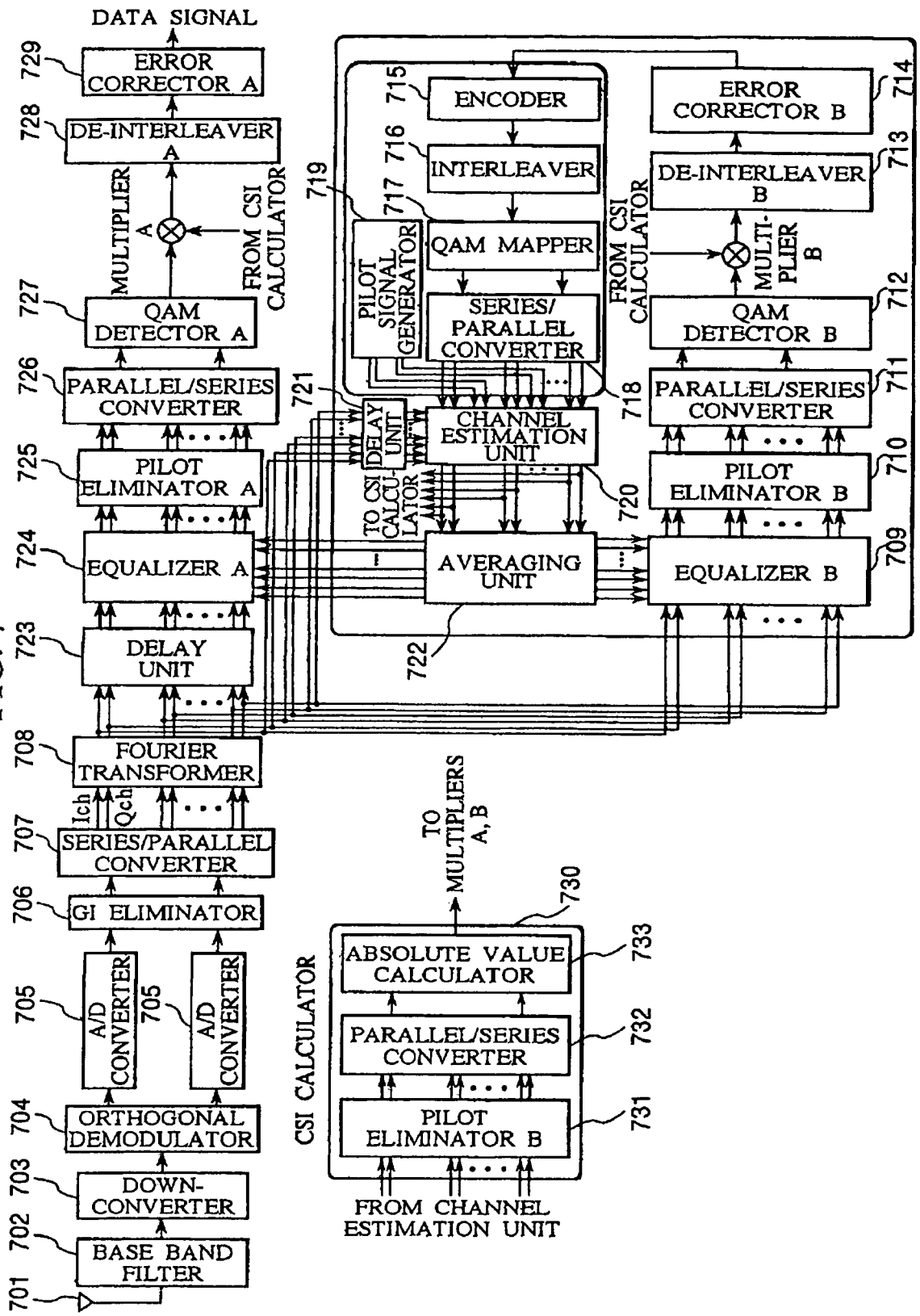
FIG. 7 is an explanatory diagram showing a more detailed structure of a receiving device according to an embodiment of the present invention.

FIG. 7 is an exemplary diagram showing the structure of the receiving device 351 of the present embodiment more specifically. The following explanation will be made with reference to FIG. 7.

The receiving device 351 receives by an antenna 701, a signal which has been sent from the sending device 301 and has incurred the influence of multipath by the transmission path. A base band filter 702 selects only the necessary band from the received signal, and a down-converter 703 frequency-converts the selected signal into an OFDM base band signal. Then, the OFDM base band signal is divided by an orthogonal demodulator 704 to be into an I channel and into a Q channel. The respective signals are converted by A/D converters 705 into digital signals. Further, a GI eliminator 706 eliminates guard intervals from the digital signals.

Then, a series/parallel converter 707 applies series/parallel conversion to each characteristic is $10^{-2}$. This result is considered to be due to that since equalization is performed all the time using a channel response delayed by nds, an error in the fluctuation of signal levels of sub carriers becomes large, the CSI calculation is not therefore successful, and even the accuracy for demodulation of a sub carrier fluctuation of whose signal level is high (i.e. information reliability is high) becomes worse.

(2) In case of nds=5, the PER characteristic is worse than that of a case of nds=1, by approximately 4 dB. Accordingly, it is expected that an error floor appears likewise the case of nds=10.

Figure 9:
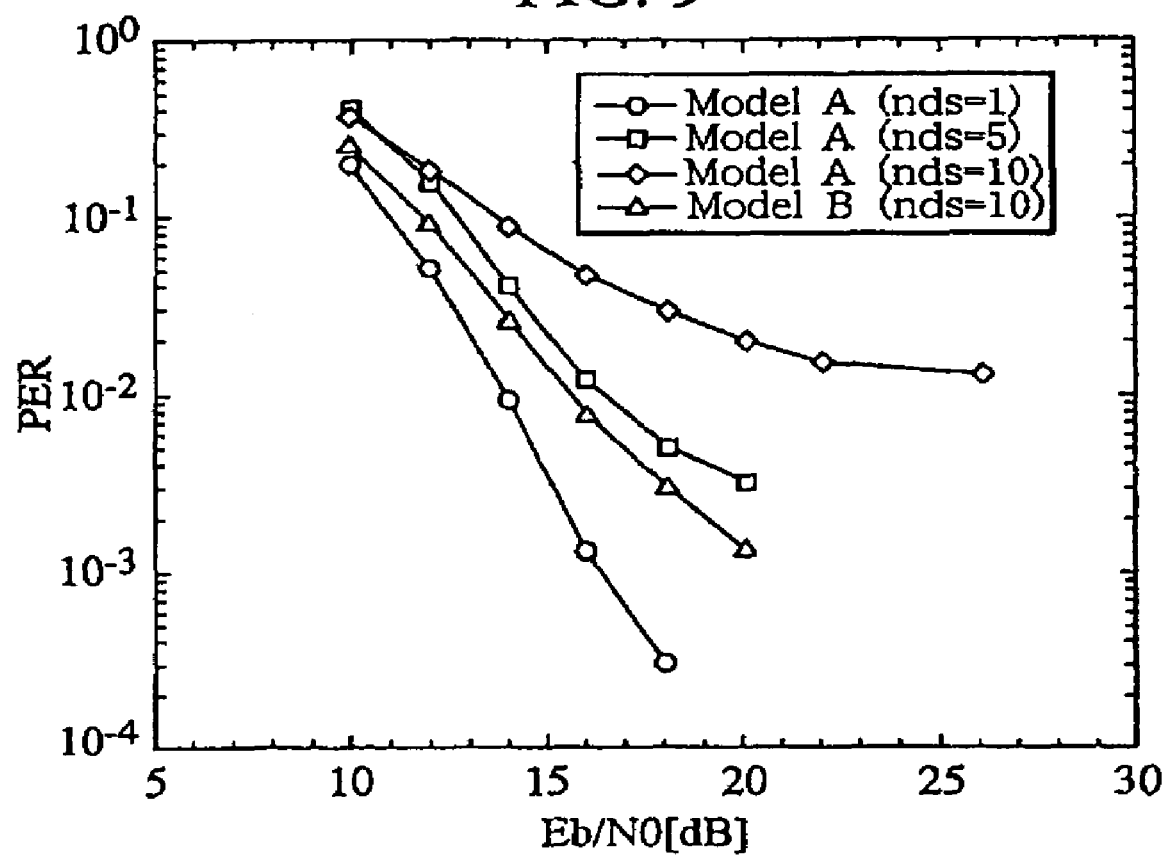
FIG. 9 is a graph showing experimental results of computer simulation for examining receiving characteristics.

On the other hand, according to the graph in FIG. 9, the Model B has the following characteristics.

(1) The PER characteristic is apparently improved as compared to the Model A. For example, a floor error that appears in the Model A at PER=$10^{-3}$ does not appear in the Model B.

(2) Characteristics are different from those of the Model A in case of nds=1. The reason why the characteristics of the Model B are different from the ideal values with the assumption that there is no process delay, is that since the replica unit 356 performs equalization using all the time an estimated value for a channel response delayed by nds, the accuracy becomes lower than the ideal values.

(3) Although not shown in the graph, in a case where nds becomes smaller to such as nds=5, it is expected that the characteristics are more improved and become closer to the ideal values. In this case, it is expected that better receiving characteristics can be obtained than those of the Model A in case of the same nds value.

As explained above, according to the present invention, it is possible to provide a receiving device and receiving method suitable for adaptively estimating a transmission path characteristic and equalizing a received signal in mobile communication, particularly OFDM packet mobile communication, and a program for realizing these by a computer.

Various embodiments and changes may be made thereunto without departing from symbol, and a Fourier transformer 708 applies fast Fourier transform to restore each sub carrier to the QAM signal.

Functions so far roughly correspond to the receiving unit 352 in the above-described functional structure.

The QAM signals obtained here do not have accurate digital values due to a distortion caused by the signals having passed through a multiplex transmission path. Estimation of a transmission path characteristic to be described below is carried out in order to compensate for/equalize such a distortion.

Channel response can be used as a transmission path characteristic. Channel response is a ratio of an actual signal in each channel to a signal in each channel which is assumed to have incurred no transmission path distortion (i.e. a signal which is sent from the sending device as a sending signal, then immediately received by the receiving device as a reception signal, and divided into each channel).

Consideration will be given to a process to be performed after a CE symbol in the preamble domain 102 is first received and a QAM signal corresponding to this CE symbol is output form the Fourier transformer 708.

Since the CE symbol of this QAM signal is a known signal, this QAM signal is immediately supplied to a channel estimation unit 720. The channel estimation unit 720 compares this QAM signal with a known signal output by a pilot signal generator 719 (the same known signal as that output by the pilot signal generator 306 of the sending device 301), thereby obtaining a channel response.

An averaging unit 722 buffers a predetermined number of channel responses obtained so far in time series for each channel, and takes the averages of the buffered channel responses. According to the present embodiment, two CE symbols exist in one frame because equalization of the data, is performed by averaging these two CE symbols.

An equalizer 709 equalizes the QAM signal output by the Fourier transformer 708 using the average of the channel responses output by the averaging unit 722.

It is preferred that a process time for each signal and a frame length be adjusted so that a QAM signal in the data domain 103 will be supplied to the equalizer 709 at the same time as averaging of the two CE symbols is completed. In this manner, the transmission path characteristics of the times respectively corresponding to the two CE symbols can be used for equalization of, at least, the data$_1$.

When equalization is performed by the equalizer 709, a pilot eliminator 710 eliminates the pilot symbol, and a parallel/series converter 711 converts the signal in each channel into two signals, namely an Ich signal and a Qch signal.

A QAM detector 712 is for performing a process inverse to the process performed by the QAM mapper 304. The QAM mapper 712 performs determination based on a QAM value, multiplies this QAM data by an output from a CSI calculator 730, and supplies the result to a de-interleaver 713. The CSI calculator 730 is for calculating the absolute values of the Ich signal and Qch signal when these two are regarded as complex values.

The de-interleaver 713 is for performing a process inverse to the process performed by the interleaver 303, i.e. for restoring the scrambled data to the original.

An error corrector 714 corrects an error in the data signal by using a Viterbi algorithm or the like.

Accordingly, the processes performed by the equalizer 709 to the error corrector 714 correspond to the processes performed by the compensation unit 501 and the demodulation unit 502, and the output from the error corrector 714 corresponds to a provisional estimated value of the data signal entered to the sending device 301.

Then, an encoder 715, an interleaver 716, a QAM mapper 717, and a series/parallel converter 718 perform the same processes as those performed by the encoder 302, interleaver 303, QAM mapper 304, and series/parallel converter 305 of the sending device 305, thereby obtaining a replica. Therefore, the processes performed by these functions correspond to the process performed by the modulation unit 503.

The replica obtained in this manner corresponds to the $data_1, \ldots, data_L$, and is supplied to the channel estimation unit 720 after the known signal generated by the pilot signal generator 719.

Here, a delay unit 721 is supposed to operate in a manner that a QAM signal corresponding to $data_i$ is supplied to the channel estimation unit 720 at the same time i-th replica $data_j$ is supplied to the channel estimation unit 720.

In the meantime, the averaging unit 722 buffers channel responses in the predetermined number which are supplied thereto last in time series, and averages these channel responses.

The following methods are usable in the averaging.

(1) To use any of arithmetic mean, harmonic mean, and geometric mean.

(2) To take a weighted average in the above-listed averaging methods, so that the weights of the older ones among an N number of channel response values are smaller, which is the same as introducing a so-called forgetting factor.

(3) To replace a channel response value in time series with a value immediately before it, in a case where a ratio of the channel response value to the value immediately before it exceeds a predetermined maximum threshold or lowers below a predetermined minimum threshold.

(4) To take an average by attaching weight corresponding to a symbol point, in a modulation method such as quadrature amplitude modulation (QAM) where amplitude (electricity) varies in accordance with a mapping point.

(5) To arbitrarily combine the above methods.

A transmission path characteristic can be obtained in this manner. As obvious from the above explanation, a predetermined delay time Δt is taken from when a signal branched from a signal output from the Fourier transformer 708 is supplied to the compensation unit 501 (equalizer 709) until when a transmission path characteristic, which is a fragment of this signal, is output from the estimation unit 603 (averaging unit 722).

Thus, a delay unit 723 supplies the signal output from the Fourier transformer 708 to an equalizer 724 by delaying this signal by the delay time Δt. Due to this, the equalizer 724 is supplied with a fragment of a signal and a transmission path characteristic corresponding to the fragment of the signal, and thereby it is expected that equalization of a higher-quality than equalization (compensation) by the equalizer 709 can be carried out by the equalizer 724. The equalizer 724 corresponds to the compensation unit 401.

The delay time by the delay unit 723 needs not necessarily be equal to Δt, but the effect of the present invention is ensured if the delay time by the delay unit 723 is equal to or smaller than Δt. However, it is desired that the delay time be equal to Δt, that is, a fragment of a signal and a transmission path characteristic corresponding to the fragment of the signal be supplied to the equalizer/demodulator 355 at the same time as each other.

After the equalization by the equalizer 724, the signal is passed through a pilot eliminator 725, a parallel/series converter 726, and a QAM detector 727, and is multiplied by a result of the CSI calculator 730. Then, the signal is passed through a de-interleaver 728, and a data signal is obtained by an error corrector 729. That is, the processes performed by these functions correspond to the process performed by the demodulation unit 402.

This series of processes is the same as the processes through the pilot eliminator 710, parallel-series converter 711, and QAM detector 712, multiplication by the result of the CSI calculator 730, and the processes through the de-interleaver 713 and error corrector 714.

The information reliability (improbability of error) of a determined value obtained as a result of determination performed by the QAM detectors 712 and 727 varies in accordance with an S/N ratio of a sub channel before equalization (compensation). Accordingly, if the determined value is attached weight in accordance with its information reliability in a correction method for correcting an error by metric calculation such as Viterbi algorithm, etc., the receiving characteristic of the device can further be improved.

The weighting factor here is generally called transmission path condition information, and the absolute value of a channel response is equal to an S/N ratio. The absolute value of a channel response can therefore be used as the transmission path condition information.

The CSI calculator 730 is used for obtaining such transmission path condition information. That is, a pilot eliminator 731 eliminates a pilot, a parallel/series converter 732 acquires a Qch signal and an Ich signal, and an absolute value calculator 733 obtains the absolute value of a channel response of the entire channel as the transmission path condition information.

(Result of Experiment)

The performance of a case where OFDM packet communication is performed by using the method of the present embodiment is examined based on computer simulation. Parameters used for the experiment are as follows.

Primary modulation—16 QAM
Symbol rate—256 k symbol/sec
Number of sub carriers—52
Number of pilot sub carriers—4
Bit rate—24 M bits/sec
Number of FFT points—64
Guard interval length—¼ of an OFDM symbol
Number of CE symbols included in one packet—2
FEC method—convolutional encoding, soft decision Viterbi decoding (R=½, K=7)
Interleaving size—corresponding to one OFDM symbol
Number of OFDM symbols used for averaging in time axis direction—8
Maximum Doppler frequency—500 Hz
Information data number—1200 bytes (corresponding to approx. 100 OFDM symbols)
Multipath fading model—18-wave BRAN fading model (average delay dispersion τ=150 ns)

Figure 8:
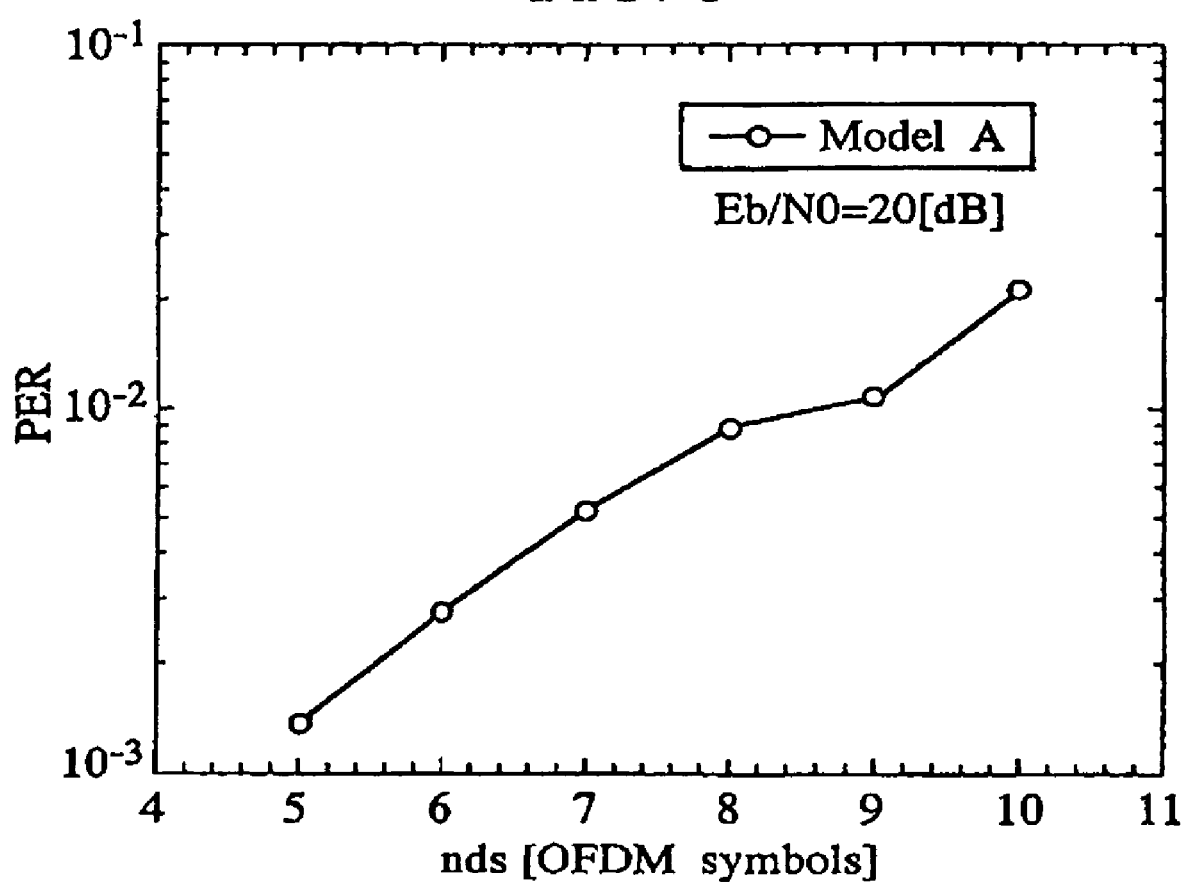
FIG. 8 is a graph showing experimental results of computer simulation for examining receiving characteristics.

FIG. 8 is a graph showing receiving characteristics of a case where an output from the error corrector 714 is directly regarded as a data signal. (hereinafter referred to as "Model A"). In this graph, the horizontal axis represents time required for the processes from the equalizer 709 through the averaging unit 722 in units of OFDM symbol numbers (nds), while the vertical axis represents packet error rates (PER). Eb/N0 is fixed at 20 dB. In non-simulation experiments using actual devices, nds varies from approximately 5 to 10 in the status quo. However, it is considered that nds will be shorted in the future. The following will show the result of a case where simulation is conducted in accordance with the performance of a device used for experiment.

With reference to this graph, it is obvious that PER becomes worse as nds becomes larger. Particularly in case of nds=10, the receiving characteristic is worse than that of a case of nds=5, by more than 10 times. This means that a process delay greatly influences the receiving characteristic.

FIG. 9 is a graph showing receiving characteristics of a case where nds is set to 1, 5, and 10 in the Model A, and also receiving characteristics of a case based on the present embodiment where nds is set to 10, a delaying process is performed by the delay unit 723 for a time corresponding to nds=10, and an output from the error corrector 729 is regarded as a data signal (hereinafter referred to as "Model B"). The horizontal axis represents Eb/N0, while the vertical axis represents PER. In this graph, the case of nds=1 in the Model A represents ideal values when it is assumed that there is no process delay.

According to the graph in FIG. 9, the Model A has the following characteristics.

(1) In case of nds=10, an error floor is observed at the order where the PER the broad spirit and scope of the invention. The above-described embodiment is intended to illustrate the present invention, not to limit the scope of the present invention. The scope of the present invention is shown by the attached claims rather than the embodiment Various modifications made within the meaning of an equivalent of the claims of the invention and within the claims are to be regarded to be in the scope of the present invention.

This application is based on Japanese Patent Application No. 2003-52680 filed on Feb. 28, 2003 and including specification, claims, drawings and summary. The disclosure of the above Japanese Patent Application is incorporated herein by reference in its entirety.

What is claimed is:

1. A receiving device comprising:
a receiving unit which receives a signal arriving through a transmission path, as a reception signal;
a delay unit which outputs a delay signal which is obtained by delaying the reception signal by a predetermined delay time;
an estimation unit which estimates a transmission path characteristic;
an equalizer/demodulator which compensates for the delay signal with the estimated transmission path characteristic, demodulates a compensation result, and outputs a demodulation result as a transmission signal;
a replica unit which compensates for the reception signal with the previously estimated transmission path characteristic, demodulates a compensation result, modulates a demodulation result, and outputs a modulation result as a replica signal; and
an estimation unit which estimates a transmission path characteristic by comparing the reception signal with the replica signal;
wherein the predetermined delay time is longer than a symbol time length of the reception signal and is equal to a time required for processes by said replica unit and said estimation unit, in order for said equalizer/demodulator to compensate for each symbol of the reception signal with the transmission path characteristic which is estimated, by said estimation unit, for the symbol to be compensated for by said equalizer/demodulator.

2. The receiving device according to claim 1, wherein said estimation unit estimates a transmission path characteristic by comparing a signal obtained by delaying the reception signal by the predetermined delay time with the replica signal instead of by comparing the reception signal with the replica signal.

3. The receiving device according to claim 1, wherein said estimation unit averages a time series of characteristics obtained as a result of the comparing by a predetermined time length, and regards the time series of characteristics obtained as a result of the averaging as the transmission path characteristic.

4. The receiving device according to claim 1, wherein:
said receiving device uses orthogonal frequency division multiplex; and
said delay unit, said estimation unit, said equalizer/demodulator, and said replica unit perform their processes for each carrier frequency of the orthogonal frequency division multiplex.

5. A receiving method comprising:
a receiving step which receives a signal arriving through a transmission path as a reception signal;
a delaying step which outputs a delay signal obtained by delaying the reception signal by a predetermined delay time;
an estimating step which estimates a transmission path characteristic;
an equalizing/demodulating step which compensates for the delay signal with the transmission path characteristic, demodulates a compensation result, and outputs a demodulation result as a transmission signal;
a replica step which compensates for the reception signal with the previously estimated transmission path characteristic, demodulates a compensation result, modulates a demodulation result, and outputs a modulation result as a replica signal; and
an estimation step which estimates a transmission path characteristic by comparing the reception signal with the replica signal;
wherein the predetermined delay time is longer than a symbol time length of the reception signal and is equal to a time required for processes in said replica step and said estimating step, in order to compensate, in said equalizing/demodulating step, for each symbol of the reception signal with the transmission path characteristic which is estimated, in said estimating step, for the symbol to be compensated for in said equalizing/demodulating step.

6. The receiving method according to claim 5, wherein said estimating step estimates a transmission path characteristic by comparing a signal obtained by delaying the reception signal by the predetermined delay time with the replica signal instead of by comparing the reception signal with the replica signal.

7. The receiving method according to claim 5, wherein said estimating step averages a time series of characteristics obtained as a result of the comparing by a predetermined time length, and regards the time series of characteristics obtained as a result of the averaging as the transmission path characteristic.

8. The receiving method according to claim 5, wherein:
said receiving method uses orthogonal frequency division multiplex; and
said delaying step, said estimating step, said equalizing/demodulating step, and said replica step perform processes for each carrier frequency of the orthogonal frequency division multiplex.

* * * * *